US005769378A

United States Patent [19]
Correa

[11] Patent Number: 5,769,378
[45] Date of Patent: Jun. 23, 1998

[54] COMPUTER MONITOR UTILITY ASSEMBLY

[76] Inventor: Carlos Correa, 5756 W. Park Rd., Hollywood, Fla. 33021

[21] Appl. No.: 642,928

[22] Filed: May 9, 1996

[51] Int. Cl.[6] .................................................. B41J 11/02
[52] U.S. Cl. ...................................... 248/442.2; 248/918
[58] Field of Search ............................... 248/442.2, 918, 248/457, 447.2, 447, 452, 460, 459, 316.4, 279.1, 448, 924, 282.1, 231.41

[56] References Cited

U.S. PATENT DOCUMENTS

| | | | |
|---|---|---|---|
| 4,619,429 | 10/1986 | Mazza | 248/447.2 |
| 4,632,471 | 12/1986 | Visnapuu | 248/442.2 |
| 4,869,565 | 9/1989 | Bachmann | 248/918 |
| 4,960,257 | 10/1990 | Waters | 248/442.2 |
| 5,082,235 | 1/1992 | Crowther et al. | 248/279.1 |
| 5,122,941 | 6/1992 | Gross et al. | 248/918 |
| 5,125,612 | 6/1992 | McNeal | 248/442.2 |
| 5,190,258 | 3/1993 | Yu | 248/918 |
| 5,213,302 | 5/1993 | Rowe, Jr. | 248/459 |
| 5,271,593 | 12/1993 | Kinner et al. | 248/447 |
| 5,292,099 | 3/1994 | Isham et al. | 248/442.2 |
| 5,383,642 | 1/1995 | Strassberg | 248/442.2 |
| 5,499,793 | 3/1996 | Salansky | 248/918 |

Primary Examiner—Ramon O. Ramirez
Assistant Examiner—Anita M. King
Attorney, Agent, or Firm—Malloy & Malloy, P.A.

[57] ABSTRACT

The present invention is directed towards an improved computer monitor utility assembly to be used with a standard computer monitor. The computer monitor utility assembly includes primarily a universal mount base which is structured and disposed to be removeably, yet securely attached to the top surface of the monitor, and to a generally rigid top panel having a width generally equivalent to a width of the monitor. The top panel is adjustably secured to the mount base in overlying relation atop the monitor and so as to be able to slide forward and backward relative to the mount base, thereby selectively overhanging beyond the front surface of the monitor and providing shade to the monitor screen from light and glare. Further, the improved computer monitor utility assembly includes side panels are which are disposed along the opposite side surfaces of the monitor and are secure to the universal mount panel so that they may slide forward and backward relative to the mount base and thereby selectively extend beyond the front surface of the monitor in order to shade the monitor screen from light and side glare as well as provide screen privacy.

26 Claims, 4 Drawing Sheets

COMPUTER MONITOR UTILITY ASSEMBLY

BACKGROUND OF THE INVENTION

1. Field of the Invention

The present invention relates to an improved computer monitor utility assembly designed as a multipurpose accessory to be mounted on a computer monitor in order to provide additional work or storage space, convenient document positioning, increased user privacy, reduced user eyestrain and fatigue due to screen glare, and improved display readability, in a single, expandable, and convenient to utilize and implement assembly.

2. Description of the Related Art

The use of computers in a variety of applications such as word processing, accounting, desk-top publishing, computer-aided drafting, engineering, programming, and spreadsheets, is now widespread. These applications demand continued use of the computer for more hours than ever before and have raised concerns about user fatigue, eye strain, headaches, neck/back muscle tension, and other related undesirable health effects. As computer usage in the workplace has increases due to advances such as electronic mail, computer ordering/billing, internet advertising, computer faxing, and on-line services, reducing an employee's computer-related fatigue plays an increasingly vital role in enhancing productivity.

A majority of computer applications require a user to constantly refer to a document while typing. For example, word-processing, computer-aided drafting, and accounting applications require the user to refer to letters, drawings, spreadsheets, or like documents while typing. Typically the document is placed on a separate document stand placed near the computer, or flat on the user's desk and he/she must keep adjusting their line of sight between the computer monitor screen and the document. Furthermore, a flat document cannot be adjustably positioned to avoid excessive light and glare. In addition to being very inefficient, this practice significantly increases user fatigue due to neck, shoulder, or back muscle tension as well as eye strain and related irritation. As to the separate document stands, they are sometimes difficult to utilize or effectively position, especially in circumstances where a user has limited work space around their computer on which to place and maneuver such a stand into acceptable alignment.

A primary source of user eye strain and fatigue relating to a computer monitor screen display results from excessive screen brightness and glare from external light striking the monitor screen. To help overcome the effects of light striking the monitor surface, many users increase the brightness and/or contrast settings on their monitor. Such techniques are generally not favorable, however, because in addition to dramatically increasing the strain and fatigue on the user's eyes, the computer monitor may be damaged by image burn-in, a common form of display damage. Moreover, decreasing the surrounding room lighting is often not possible due to other workers, and is generally not beneficial as a computer user must still be able to look to and see other items and documents near the computer. As such, it would be beneficial to provide a comprehensive system that is capable of selectively shading the computer monitor screen from excessive light and glare so that the user will be able to naturally reduce the brightness and contrast settings on his monitor and thus extend the monitors useful life while also reducing the strain on his/her eyes.

An additional consideration often involved in computer use relates to those computer applications wherein the user is entering or viewing sensitive or confidential information. In the workplace, restricted information may consist of something as simple as preparing payroll checks. The close proximity of computer users in the workplace creates an enhanced demand for privacy when the user is dealing with restricted or confidential information. Typically a computer monitor screen offers no privacy to a user from other users sitting at adjacent computers. Consequently, another user or bystander is able to view the monitor screen from either side of the primary user. There is therefore a need in today's computer environment to provide an assembly which can easily an unobtrusively maximize a user's privacy.

Still another inconvenience associated with computer use relates to the increased demand for storage space which is either taken up by the computer and its peripheral devices, and/or which relates to usage of the computer itself. Today, computers can be adapted to include several optional peripherals such as a microphone, speakers, mouse, digitizer pen, scanner, etc., and it is more important then ever to utilize space efficiently so as to maximize usable desk space and reduce clutter. As such there is a need for an assembly which maximizes the space usage of the computer and minimizes peripheral space that is taken up as a result of the computer and/or its accessories.

In addition to use of a computer at a work place, computers are more and more frequently being utilized as sales aides, such as at a trade show. The computers uses in such a circumstance can range from illustrating new software or hardware capabilities, to demonstrating products and variations of a manufacturer which may or may not have anything to do with computers. One principal difficulty associated with utilizing a computer in those circumstances relates to the limited space available. For example, space at a trade show can be quite expensive and quite limited for each individual vendor. As a result, space considerations may sometimes take precedent over the desirability of utilizing a computer display. If, however, a system was provide which could maximize the space taken up by the computer monitor/display, it would greatly expand the effectiveness of the presentation by permitting the use of an adequate sized computer display without compromising any other sales considerations such as the use of printed charts and photos, and the convenient distribution of product literature.

Others in the past have attempted to provide items which may address one of the problems associated with computer use. For example, there are a variety of glare-guarding screen covers that are placed in front of the screen to minimize some glare. Such devices, however, may ultimately make viewing more difficult, can diminish the clarity of an image, and cannot be used with touch screen applications. Also, various external and mounted page holders exist in the secretarial field. Such conventional external page holders can take up much space, rarely position the document in a convenient accessible location next to the monitor due to space and size limitations, and generally remain in the way if not being used. Moreover, mounted page holders are usually either very large and obtrusive, or are substantially flimsy so as to not be able to effectively hold multiple documents in a convenient location. Generally, no utility item presently available addresses all of the computer user's needs in a single, solid, integrated and effective design.

Accordingly, there is a need in the art for a computer monitor utility assembly which can significantly reduce eyestrain and fatigue, can increase the available workspace in the vicinity of the computer monitor, can effectively position a document in a readable orientation, can provide an effective trade show display, can increase user screen privacy, and can reduce computer peripheral and cable clutter, all in a single, well organized assembly.

SUMMARY OF THE INVENTION

The present invention is directed towards an improved computer monitor utility assembly to be used with a computer monitor so as to provide additional work or storage space, convenient positioning of documents, increased user privacy, reduced user eyestrain and fatigue caused by screen glare, and improved display readability, in a single multi-purpose assembly.

The improved computer monitor utility assembly includes a universal mount base. The universal mount base is structured and disposed to be removably, yet securely attached to the top surface of the monitor. The improved computer monitor utility assembly further includes a generally rigid top panel. The top panel is structured to have a width generally equivalent to a width of the monitor. Furthermore, the top panel is secured to the mount base in overlying relation atop the monitor by way of upper mount means. In particular, the upper mount means are structured to provide forward and backward slided movement of the top panel relative to the mount base. As such, the top panel can selectively overhang beyond the front surface of the monitor in order to selectively shade a screen on the front surface of the monitor from light and glare.

Further included with the improved computer monitor utility assembly of the present invention are a pair of generally rigid side panels. The side panels are structured to be mounted along the opposite side surfaces of the monitor by way of adjustable side mount means. The adjustable side mount means are structured to facilitate mounting of the side panels along the opposite side surfaces of monitors of varying widths, and also provide for forward and backward slided movement of the side panels relative to the mount base. The side panels are structured to selectively extend beyond the front surface of the monitor, thereby effectively shading the screen on the front surface of the monitor from light and side glare, and providing substantial screen privacy.

It is an object of the present invention to provide an improved computer monitor utility assembly which increases a user's work or storage space at a computer terminal without sacrificing valuable desktop space.

Another object of the present invention is to provide an improved computer monitor utility assembly which minimizes user fatigue, relieves eye stress and strain, and improves monitor screen colors and readability by minimizing the amount of external light striking the surface of the monitor screen and thereby eliminating undue screen glare.

It is also an object of the present invention to provide an improved computer monitor utility assembly which allows the user to adjust the assembly so that he/she can increase or decrease the amount of light striking the surface of the monitor screen to a comfortable level.

Another object of the present invention is to provide an improved computer monitor utility assembly which provides enhanced privacy to a user dealing with sensitive, restricted, or confidential information.

An additional object of the present invention is to provide an improved computer monitor utility assembly which can effectively position a variety of computer utility items in a convenient, useable, and space maximizing orientation.

A further object of the present invention is to provide an improved computer monitor utility assembly which provides a user with a convenient and effective sales/informational display by including a display easel or informational literature holding tray with the monitor display.

Also an object of the present invention is to provide an improved computer monitor utility assembly which maintains all external, peripheral wires conveniently arranged and organized.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
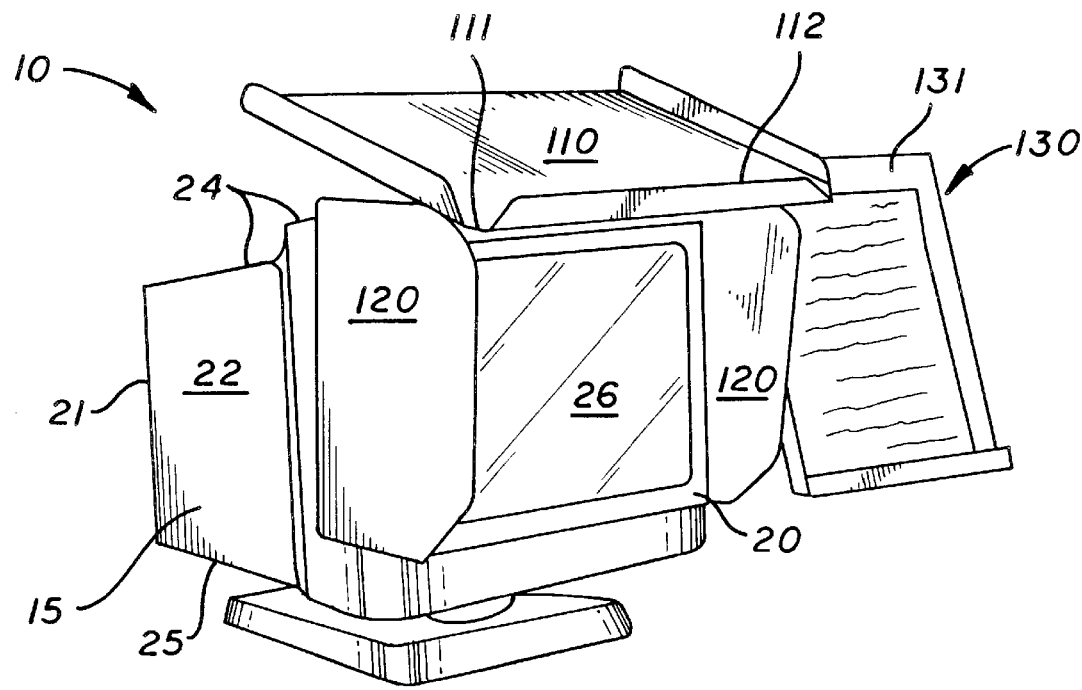
FIG. 1 is a perspective view showing the front of the improved computer monitor assembly attached to a standard monitor.

Shown throughout the figures, the present invention is directed towards an improved computer monitor utility assembly, generally indicated as 10. The improved computer monitor utility assembly 10 is structured to be utilized on a computer monitor 15 so as to provide a variety of utility and convenience features in a single, consolidated, multi-purpose assembly. Generally, the computer monitor 15 with which the improved computer monitor utility assembly 10 of the present invention is to be used is of a standard configuration including a front surface 20, on which the screen display 26 is located, a rear surface 21, a pair of opposite side surfaces 22 and 23, a top surface 24 and a bottom surface 25. Furthermore, the standard monitor 15 is usually of the type which can swivel and pivot to provide for convenient orientation of the display screen 26 for the user. As such, the improved computer monitor utility assembly 10 is structured not to hinder or interfere with that screen adjustment by a user.

Turning to the computer monitor utility assembly 10 itself, it includes a universal mount base 30. The universal mount base 30 is structured and disposed to be removably, yet securely attached to the top surface 24 of the monitor 15, in a preferably centrally disposed orientation. Moreover, the universal mount base 30 is preferably secured generally near the front surface 20 of the monitor 15 and is structured to provide the primary secured engagement between the computer monitor utility assembly 10 and the monitor 15. Preferably, the universal mount base 30 is a substantially rigid, elongate member, and is secured to the monitor 15 by way of a substantially high density hook and loop fastener pad 46. The individual portions of the hook and loop fastener pad 46 are correspondingly secured in a substantially strong manner, by an adhesive or equivalently secure fastening means, to the universal mount base 30 and to the top surface 24 of the monitor 15 such that they may be correspondingly secured together with the high density construction thereof maintaining the substantially secure yet removable connection.

Figure 2:
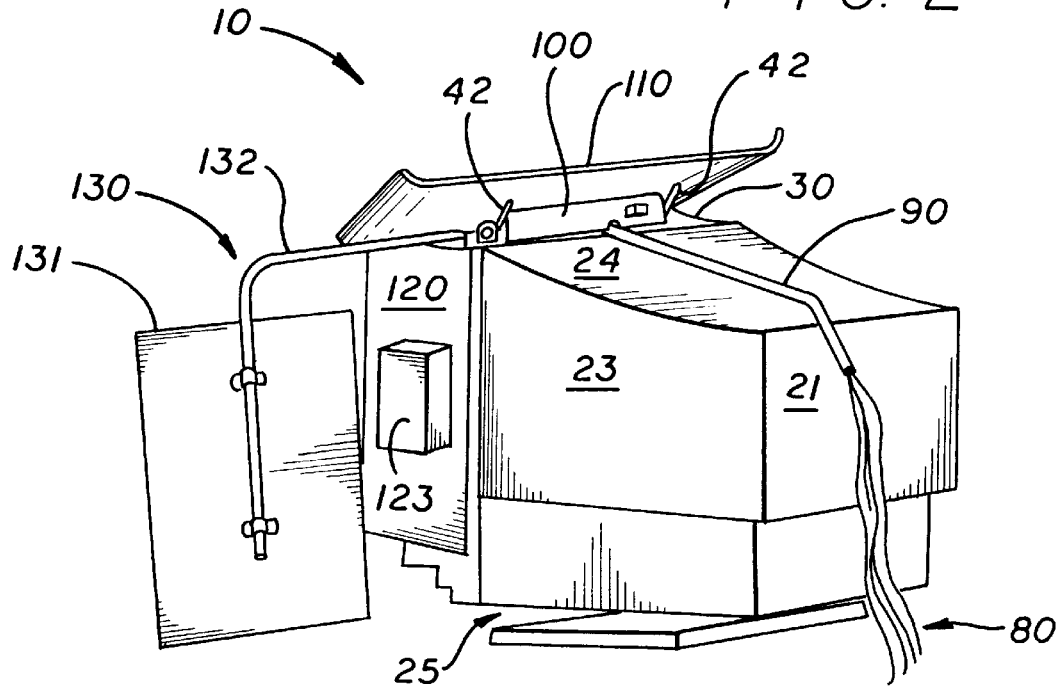
FIG. 2 is a rear perspective view of the improved computer monitor assembly attached to a standard monitor.

The computer monitor utility assembly 10 if the present invention further includes a top panel 110. The top panel 110 is structured to be secured in overlying relation atop the monitor as best shown in FIGS. 1 and 2. In the preferred embodiment, the top panel 110 is generally rigid and has a width generally equivalent to a width of the monitor. Furthermore, the top panel 110 is structured such that it may overhang beyond the front surface 20 of the monitor in order to selectively shade the screen 26 on the front surface 20 of the monitor 15 from light and glare. Additionally, the top panel 110 preferably includes a lip 112 extending along a front edge 111 thereof. The lip 112 functions to substantially retain notebooks, letters, documents, fliers, or similar materials which are placed on the top panel 110 in a convenient, out of the way, space maximizing, accessible location. Moreover, to effectuate this purpose, the top panel 110 is preferably to be disposed in a downwardly sloped direction towards the front edge 111 as best shown in FIG. 1. Similarly, the top panel 110 may also include raised lips on its side edges, as shown in FIGS. 1 and 2, so that items placed on the top panel 110 cannot slide off.

Figure 3:
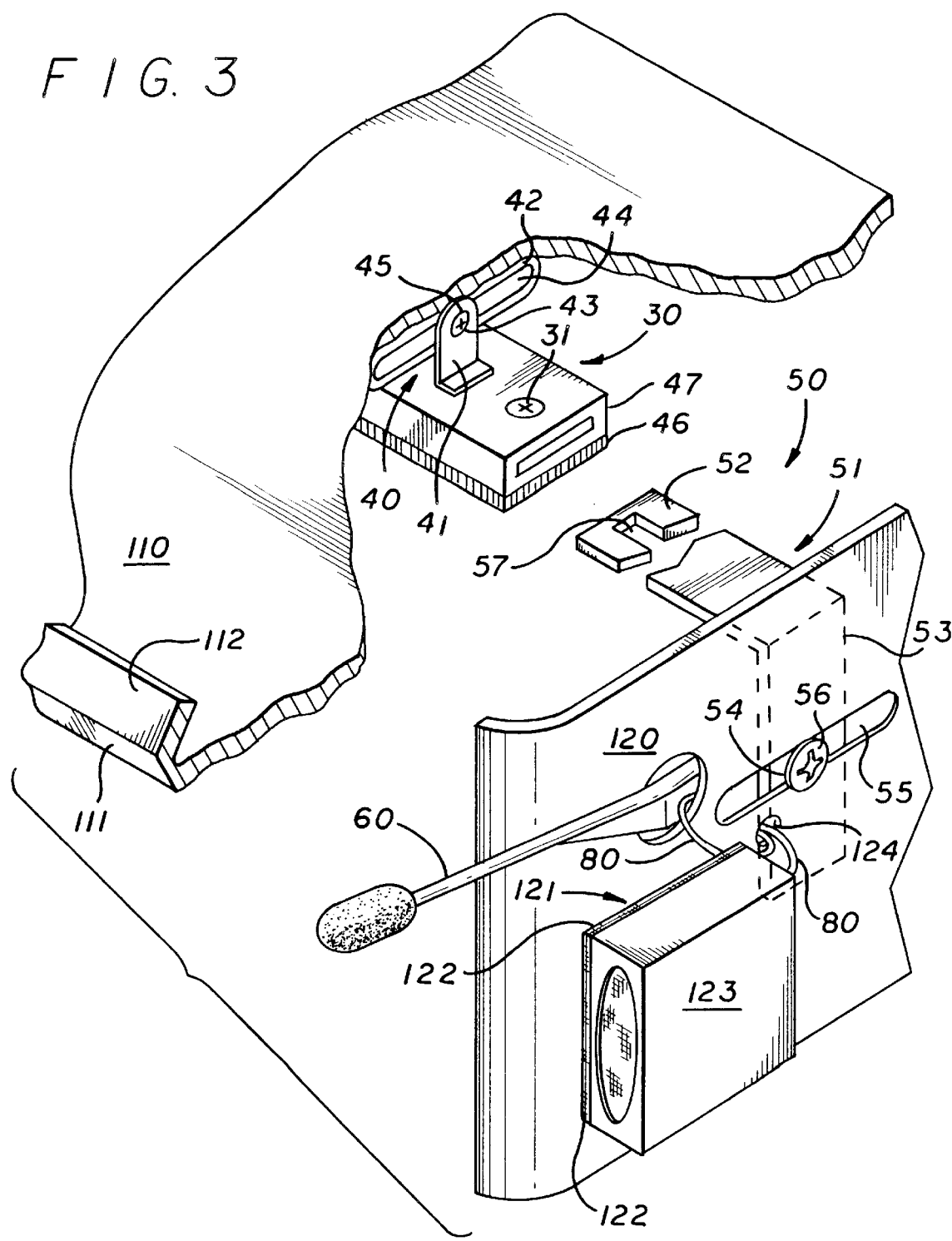
FIG. 3 is a perspective partial view of the side panel mounting to the universal mount base.
Figure 4:
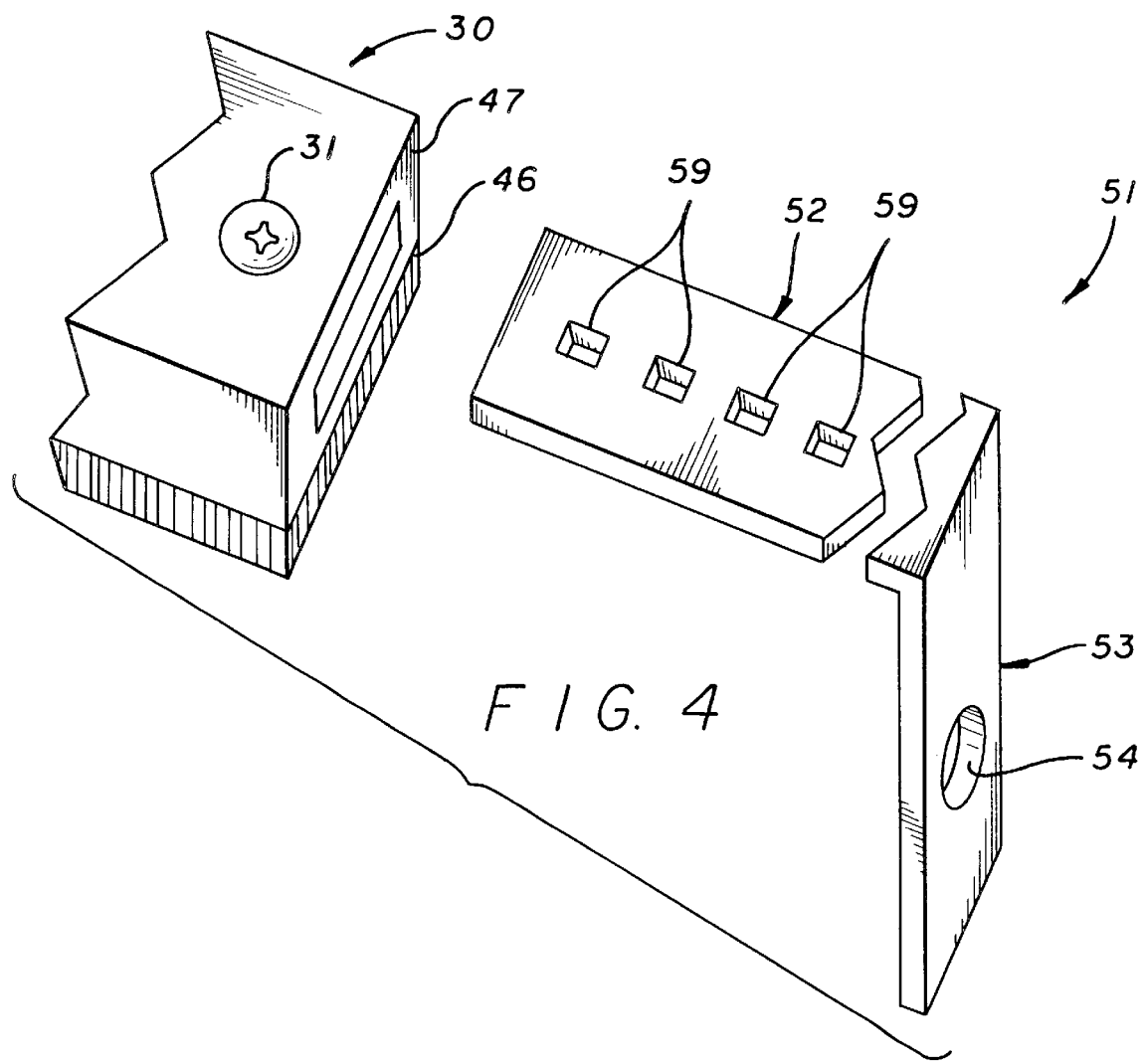
FIG. 4 is a perspective view showing an alternative embodiment of the L-shaped members.
Figure 5:
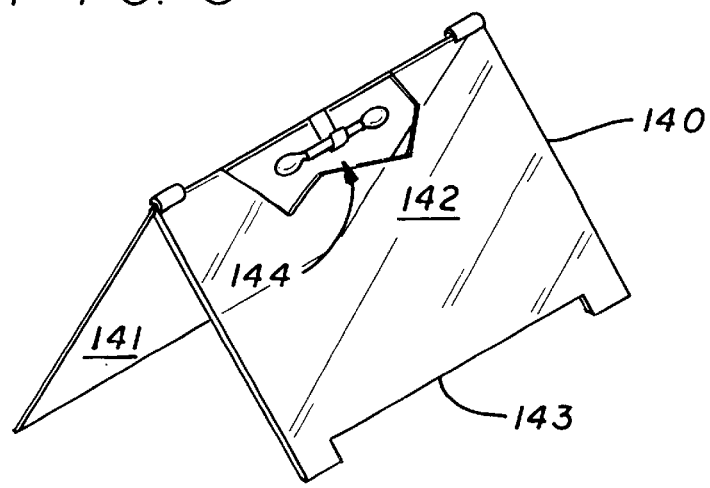
FIG. 5 is a perspective view of the display easel.
Figure 6:
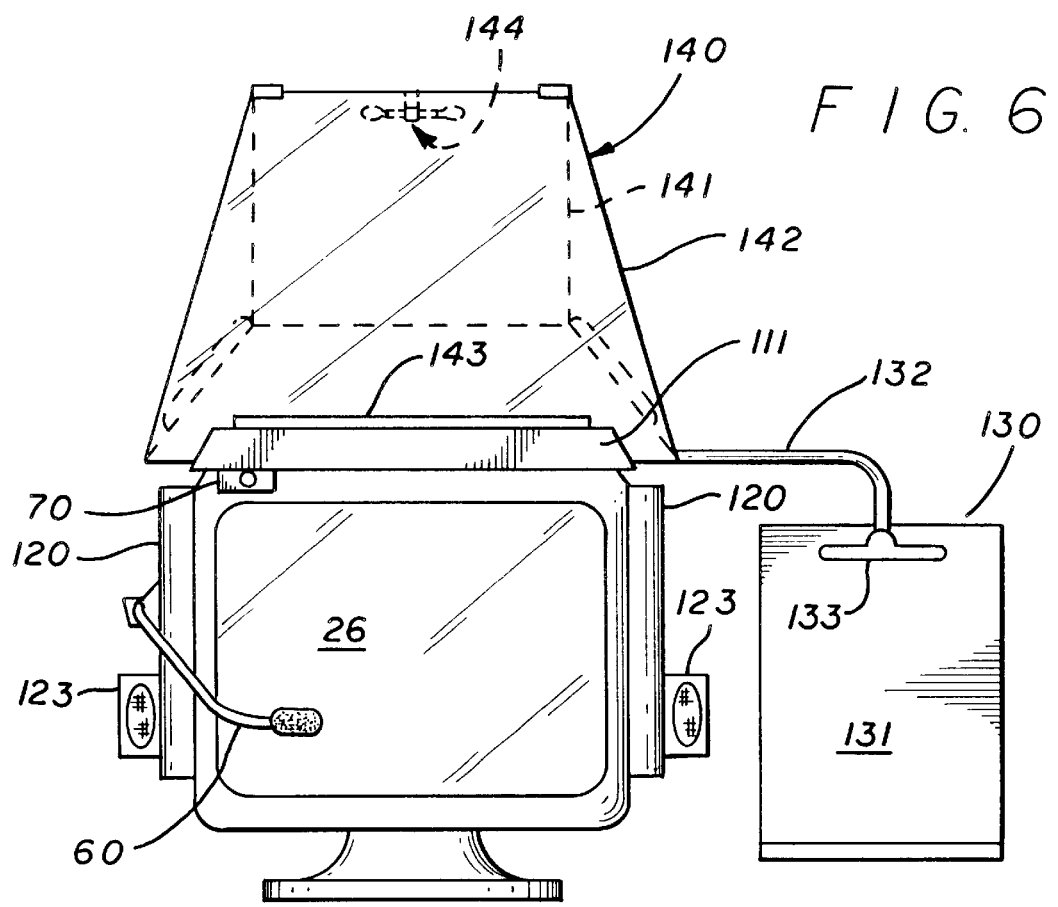
FIG. 6 is front view of the improved computer monitor assembly with the display easel in place.

The top panel 110 is secured to the mount base 30 in overlying relation atop the monitor by way of upper mount means 40. The upper mount means 40 are structured to provide pivotal as well as forward and backward sliding movement of the top panel 110 relative to the universal mount base 30. As such, the top panel 110 can be variably positioned in a desired shading and/or document supporting orientation by the user. In the preferred embodiment, the upper mount means 40 include a pair of bracket members 41 extending upwardly from the universal mount base 30 in generally spaced apart relation from one another, as shown in FIG. 3. Further, the bracket members 41 each preferably include an aperture 43 formed therein. Disposed in generally adjacent, abutting engagement with the bracket members 41, and included as part of the upper mount means 40, are a pair of flanges 42. The flanges 42 are disposed in generally spaced apart relation from one another, preferably to substantially correspond the spacing between the bracket members 41, and are secured to and extend downwardly from the top panel 110. Moreover, each flange 42 preferably includes an elongate slot 44 defined therein. The bracket members 41 and flanges 42 are disposed relative to one another such that at least one, but preferably a pair of fastener elements 45 can extend through each of the apertures 43 in the bracket members 41 and through each corresponding slot 44 of the flanges 42. As such, the flange 42 is able to pivot and slide relative to the bracket members 41, and the top panel 110 correspondingly slides and pivots relative to the mount base 30 so that its position can be adjusted. Further, tightening or loosening of the fastener elements 45, such as through the use of bolts and nuts, can effectively secure the top panel in a desired position until adjustment is needed. With regard to the upper mount means 40, it is noted that the bracket members may be configured with elongate slots in addition to or instead of the elongate slots being disposed on the flanges alone.

The improved computer monitor utility assembly 10 of the present invention further includes a pair of generally rigid side panels 120. The side panels 120 are structured and disposed to extend along the opposite side surfaces 22 and 23 of the monitor 15, and to selectively extend beyond the front surface 20 of the monitor 15. Accordingly, the side panels 120 substantially shade the monitor screen 26 from light and side glare, and provide a user with screen privacy. In particular, by reducing the amount of light striking the monitor screen 26, the fatigue and strain upon a user's eyes is reduced due to the improvement in the colors and readability of the monitor screen 26. Furthermore, by effectively shading the monitor from screen glare a user can reduce the monitor brightness and contrast level settings. Along with significantly reducing the strain on a user's eyes, lowering the intensity of the monitor screen's brightness and contrast levels also helps protect the monitor from image burn-in, the most common form of display damage.

The side panels 120 are secured along the opposite side surfaces 22 and 23 of the monitor by way of adjustable side mount means 50. The adjustable side mount means 50 are structured to provide forward and backward slided movement of the side panels 120 relative to the mount base 30. Accordingly, a user is able to adjust the side panels 120 to either increase or limit the amount of light striking the monitor screen 26. Moreover, if only a single side of the monitor's location results in the glare or requires privacy, each of the side panels 120 can be independently positioned to provide more or less shading.

The adjustable side mount means 50 preferably include a pair of generally L-shaped members 51. The L-shaped members 51 are structured to variably extend from opposite ends of the mount base 30 and include both a horizontal leg 52 and a downwardly depending vertical leg 53. The horizontal leg 52 is structured to be adjustably secured to the universal mount base 30, and as such, a length thereof permits appropriate, adjustable positioning of the side panels 120 along the sides of monitors of varying sizes. As to the downwardly depending vertical leg 53 of each L-shaped member 51, it extends downwardly along a corresponding side surface 22 or 23 of the monitor 15 and is secured to a corresponding side panel 120.

In the preferred embodiment, each of the vertical legs 53 of the L-shaped members 51 includes a bore 54 formed therein, and each of the side panels 120 includes a slot 55 formed therein. As such, the side panels are disposed in abutting relation with the vertical legs 53 of the L-shaped members 51 such that each of the slots 55 overlies a corresponding one of the bores 54 for receipt of the adjustable side mount means 50 include a bore 54 formed in a fastener element 56 therethrough. As such, relative slided movement of the side panels 120 is achieved. It should be noted that the slot may be equivalently be disposed in the vertical legs either in addition to or in place of the slot in the side panels. Further, any alternative configurations, such as a mating track and ridge or alternative sliding guide member may be equivalently implemented so long as it provides for slided movement of the side panels 120 relative to the monitor 15.

As previously recited, the horizontal leg 52 of each of the L-shaped members 51 is structured to be adjustably secured to the universal mount base 30. Accordingly, in the preferred embodiment, the universal mount base 30 includes a generally tubular member 47 structured and disposed to receive the horizontal leg 52 of each of the L-shaped members 51 into opposite sides thereof. In a preferred embodiment, the adjustable side mount means 50 include an elongate slot 57 formed in the horizontal leg 52 of each of the L-shaped members 51. A fastener element 31 extends from the universal mount base 30 through each of the elongate slots 57 in the horizontal legs 52, thereby providing for variable spacing of the vertical legs 53 of the L-shaped members 51 relative to the universal mount base 30. Similarly, in an alternative embodiment, the horizontal legs 52 of the L-shaped members 51 may include a plurality of spaced openings 59 rather than a single elongate slot 57. The spaced openings 59 will be structured to selectively receive an adjustable positioning element 31 secured to the universal mount base 30. Still, however, it is seen that mere frictional engagement between the horizontal legs 52 of the L-shaped members 51 and the universal mount base 30 may also achieve secured, adjustable interconnection.

Further included with the improved computer monitor utility assembly 10 is at least one adjustably positionable page holder assembly 130. The page holder assembly 130 is configured to increase desktop space and reduce neck stress and fatigue by suspending documents at eye level for viewing or data-entry purposes. The page holder assembly 130 preferably adjusts to different angles and heights to allow the user to view a document in the best lighting and glare-reducing perspective and maximum user comfort. Moreover, the page holder assembly 130 is structured to extend the page forward such that a document is visible despite the extended positioning of the side panels 120 in a shading orientation.

The page holder assembly 130 includes primarily a holder panel 131. The holder panel 131 is structured and disposed to be movable between a retracted and operative position. In the retracted position, the holder panel 131 extends along the side surface 22 or 23 of the monitor 15. In the operative position, however, the holder panel 131 is suspended generally adjacent the front surface 20 of the monitor so that a document disposed on the holder panel 131 is easily viewable by a user viewing the front surface 20 of the computer monitor as best shown in FIG. 1. In the preferred embodiment, the page holder assembly 130 also includes an elongate, rigid, generally L-shaped support rod 132. The support rod 132 is pivotally secured preferably to the horizontal leg 52 of an L-shaped member 51 and is adjustably secured to the holder panel 131 so that the holder panel 131 is adjustably suspended in an operative position. Alternatively, when not in use, the support rod 132 permits the holder panel 131 to completely swivel out of the way into a retracted position flush against the computer monitor. Moreover, the holder panel 131 includes support means 133 structured and disposed to support an article such as loose documents or a legal pad visibly on the holder panel 131. The support means 133 may include a clipboard type of clamp located at the top or bottom or even both ends of the holder panel 131, or alternatively as a lip at a lower edge of the holder panel 131.

In a preferred embodiment, the top panel 110 of the improved computer monitor utility assembly 10 is structured and disposed so that it can securely support a display easel 140 to facilitate the visible presentation of various display articles over the monitor 15. In particular, the display easel 140 preferably includes a pair of hinged panels 141 and 142 which are hingedly secured to one another along their respective top edges. At least one of the hinged panels 141 and 142 includes a lower edge cutout 143 which is structured and disposed to facilitate the secured engagement of the front panel 142 with the lip 112 on the front edge 111 of the top panel 110, and may even be structured to permit informational papers to be accessibly contained thereunder. In the preferred embodiment, the display easel 140 is at least partially translucent and includes back lighting means 144 structured and disposed to back light any display articles disposed on the easel 140.

The improved computer monitor utility assembly 10 is also configured so as to be fully adaptable and accommodating to the various computer peripherals offered in the industry. Consistent with the theme to increase functional workplace, the improved computer monitor assembly 10 is designed to support various computer cables and peripherals in a manner which frees usable desk space and reduces overall clutter. As such, the improved computer monitor utility assembly 10 may include a computer microphone 60 adjustably and operatively secured preferably to one of the side panels 120. Although a smaller microphone may be included for mounting to any portion of the assembly, in the preferred embodiment an elongate, swivelable microphone will be included such that it may extend from the side panel 120 towards the user when necessary. Moreover, an alterative embodiment of the improved computer monitor utility assembly 10 may also include a computer video camera 70 adjustably mounted in a similar manner to one of the side panels 120 or beneath the top panel 110 so as to effectively capture a person utilizing the computer.

Further, the improved computer monitor utility assembly 10 may include speaker mount means 121 on each of the side panels 120. The speaker mount means 121 are structured and disposed to provide for the removable mounting of external computer speakers 123 onto the side panels 120. In the preferred embodiment, the speaker mount means 121 will be secured by way of a high density hook and loop fastener pad 122 matingly disposed on each of the external computer speakers 123 and each of the side panels 120. It is understood, however, that a mount bracket may also be included as speaker mount means 121, and in fact the speakers 123 may be integrally mounted with the side panels 120.

Figure 7:
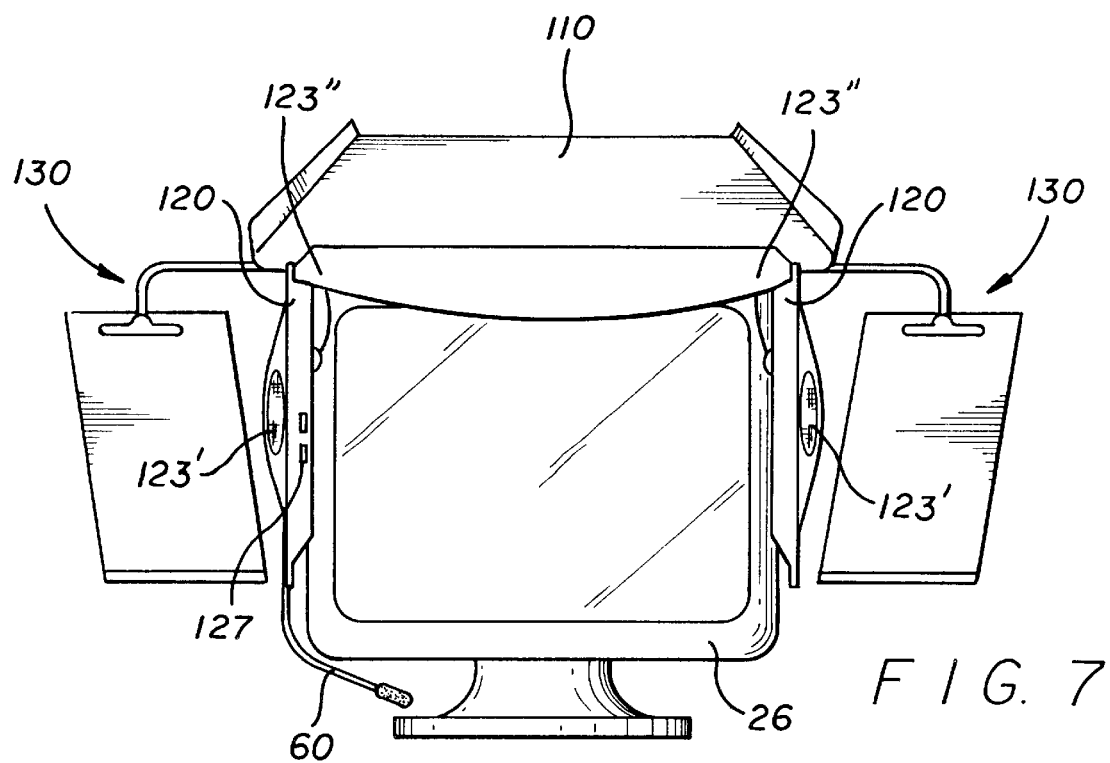
FIG. 7 is a perspective view of an alternative embodiment of the improved computer monitor assembly including built in speakers.

Furthermore, in another alternative embodiment, the computer speakers 123' may be integrally molded into the side panels 120, as illustrated in FIG. 7. Such a configuration permits a narrower, more finished profile to be achieved and facilitates internal wiring and greater stability. Similarly, a plurality of plugs or jacks for facilitated connection to various types of external component plugs, or switches and controls, such as a volume control may also be molded or otherwise secured to one or both of the side panels 120. In this regard, one switch preferably includes an audio mode selection switch 127. The audio mode selection switch 127 is structured to permit a user to select between normal audio and "personal sound" audio. Specifically, in some instances, the normal volume of external speakers may be to great, and too difficult for the computer user to hear if kept too low, and/or privacy may sometimes be desired with regard to the audio being heard. As such, as a further embodiment of the present invention, a pair of interior, focused speakers 123" may be included and disposed on an interior surface of one or both side panels 120. Accordingly, when both side panels are disposed so as to shield the monitor screen, a low level audio can be focused directly at the user. Subsequently, merely by actuating the audio mode selection switch 127 normal audio can be reestablished.

As can be appreciated, in any multi-media computer set up, a number of peripheral cables are included and directed towards the CPU. In order to conveniently direct and store those various peripheral cables utilized, in a preferred embodiment, the side panels 120 preferably include at least one aperture 124 formed therein which is structured to receive any peripheral or utility cable 80 extending from a utility item disposed on the side panel 120. As such, the aperture facilitates the concealed, organized passage of any utility cables along the L-shaped members 51 to the universal mount base 30, such as by clips and the like. Also, in the preferred embodiment, a cable sleeve 90 extends from the mount base 30 and is structured to receive all of the utility cables 80 and provide organized passage of the utility cables 80 towards the rear surface 21 of the monitor. Furthermore, a transformer 100 may be secured to the mount base 30 so as to receive corresponding utility cables 80 therein and direct a single power cable to the power supply.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. To enhance the effectiveness of a computer monitor of the type having a front surface, a rear surface, a pair of opposite side surfaces, a top surface and a bottom surface, a computer monitor utility assembly comprising:

a universal mount base structured and disposed to be removably, yet securely attached to the top surface of the monitor, a generally rigid top panel, said top panel having a width generally equivalent to a width of the monitor, upper mount means structured and disposed to secure said top panel to said mount base, in overlying relation atop the monitor, said upper mount means being further structured to provide forward and backward, slided movement of said top panel relative to said mount base such that said top panel selectively overhangs beyond the front surface of the monitor in order to selectively shade and screen a screen on the front surface of the monitor from light and glare, a pair of generally rigid side panels, adjustable side mount means structured and disposed to mount said rigid side panels along the opposite side surfaces of monitors of varying widths, said adjustable side mount means being further structured to provide forward and backward, slided movement of said side panels relative to said mount base such that said side panels selectively extend beyond the front surface of the monitor in order to selectively shade and screen the screen on the front surface of the monitor from light and side glare and provide screen privacy, and said adjustable side mount means comprising:

a pair of generally L-shaped members structured to variably extend from opposite sides of said mount base, said L-shaped members each including a horizontal leg, which is secured to said mount base, and a downwardly depending, vertical leg, which extends downwardly alone a corresponding one of the side surfaces of the monitor.

2. A computer monitor utility assembly as recited in claim 1 wherein said upper mount means comprises:

a pair of spaced bracket members extending upwardly from said mount base, a pair of spaced flanges extending downwardly from said top panel and structured for generally adjacent, abutting engagement with said bracket members, each of said bracket members including an aperture formed therein, each of said flanges including an elongate slot formed therein, and a pair of fastener elements, each of said fastener elements being structured and disposed to extend through a corresponding one of said apertures in said bracket members and a corresponding one of said slots in said flanges such that said flanges, and therefore said top panel, are able to slide and pivot relative to said bracket members, and therefore said mount base.

3. A computer monitor utility assembly as recited in claim 1 wherein said universal mount base is mounted to the top surface of the computer monitor by substantially high density hook and loop fastener pads secured matingly to said mount base and the top surface of the monitor, said hook and loop fastener pads having a substantially strong interlocking strength.

4. A computer monitor utility assembly as recited in claim 1 wherein said adjustable side mount means further includes a bore formed in each of said vertical legs of said L-shaped members and a slot formed in each of said side panels, said bore and said slot of each of said vertical legs and side panels being structured and disposed to receive a fastener element therethrough so as to provide for relative, slided movement therebetween.

5. A computer monitor utility assembly as recited in claim 1 wherein said adjustable side mount means further include an elongate slot formed in said horizontal leg of each of said L-shaped members and a fastener element extending from said mount base through each of said elongate slots in said horizontal legs so as to provide for variable spacing of said vertical legs of said L-shaped members relative to said mount base.

6. A computer monitor utility assembly as recited in claim 1 wherein said mount base includes a generally tubular member structured and disposed to receive said horizontal leg of each of said L-shaped members into opposite sides thereof for adjustable securing therein.

7. A computer monitor utility assembly as recited in claim 6, wherein said horizontal leg of each of said L-shaped members includes a plurality of spaced openings structured to selectively receive an adjustable positioning element therethrough.

8. A computer monitor utility assembly as recited in claim 1 further including speaker mount means on each of said side panels, said speaker mount means being structured and disposed to provide for removable mounting of an external computer speaker to each of said side panels.

9. A computer monitor utility assembly as recited in claim 8 wherein said speaker mount means includes a hook and loop fastener pad matingly disposed on each of the speakers and each of said side panels.

10. A computer monitor utility assembly as recited in claim 1 further including at least one adjustably positionable page holder assembly, said page holder assembly including a holder panel and being structured and disposed to be moveable between a retracted position, wherein said holder panel extends along the side surface of the monitor, and an operative position, wherein said holder panel is operatively suspended generally adjacent the front surface of the monitor such that an article supportably disposed on said holder panel is easily viewable by a user viewing the front surface of the monitor.

11. A computer monitor utility assembly as recited in claim 1 further including at least one adjustably positionable page holder assembly, said page holder assembly including a holder panel and being structured and disposed to be moveable between a retracted position, wherein said holder panel extends along the side surface of the monitor, and an operative position, wherein said holder panel is operatively suspended generally adjacent the front surface of the monitor such that an article supportably disposed on said holder panel is easily viewable by a user viewing the front surface of the monitor.

12. A computer monitor utility assembly as recited in claim 11 wherein said page holder assembly includes an elongate, rigid, generally L-shaped support rod pivotally secured to said horizontal leg of a corresponding one of said L-shaped members, and adjustably secured to said holder panel, so as to adjustably suspend said holder panel in said operative position.

13. A computer monitor utility assembly as recited in claim 12 wherein said holder panel includes support means structured and disposed to support at least one of the articles visibly on said holder panel.

14. A computer monitor utility assembly as recited in claim 1 wherein said top panel includes a lip disposed at least on a front edge thereof, said lip being structured and disposed to retain at least one article placed on said top panel.

15. A computer monitor utility assembly as recited in claim 14 wherein said top panel is structured and disposed to receive a display easel supportably and securely thereon so as to facilitate the visible presentation of various display articles over the monitor.

16. A computer monitor utility assembly as recited in claim 15 wherein said display easel includes a pair of hinged panels, hingedly secured to one another along respective top edges thereof, at least a front one of said hinged panels including a lower edge cut out structured and disposed to facilitate securing engagement of said front panel with said lip on said front edge of said top panel.

17. A computer monitor utility assembly as recited in claim 15 wherein said display easel is at least partially translucent and includes back lighting means structured and disposed to back light the display article disposed on said easel.

18. A computer monitor utility assembly as recited in claim 1 wherein said top panel is structured and disposed to receive a display easel supportably and securely thereon so as to facilitate the visible presentation of various display articles over the monitor.

19. A computer monitor utility assembly as recited in claim 1 further including a computer microphone adjustably secured to one of said side panels.

20. A computer monitor utility assembly as recited in claim 1 further including a computer video camera adjustably mounted to one of said side panels.

21. A computer monitor utility assembly as recited in claim 1 wherein each of said side panels includes an aperture formed therein and structured to receive a utility cable extending from a utility item disposed thereon so as to facilitate concealed, organized passage of the utility cables along said L-shaped members to said mount base.

22. A computer monitor utility assembly as recited in claim 21 further including a cable sleeve extending from said mount base and structured to receive all of the utility cables therein for organized passage towards the rear surface of the monitor.

23. A computer monitor utility assembly as recited in claim 21 wherein said mount base includes a transformer secured thereto and structured to receive corresponding ones of the utility cables therein.

24. A computer monitor utility assembly as recited in claim 1 wherein each of said side panels includes a computer speaker integrally molded therein.

25. A computer monitor utility assembly as recited in claim 1 wherein each of said side panels includes an internally mounted, focused personal sound speaker disposed on an interior surface thereof, and structured to be selectively implemented to provide private, personal audio to a computer user.

26. To enhance the effectiveness of a computer monitor of the type having a front surface, a rear surface, a pair of opposite side surfaces, a top surface and a bottom surface, a computer monitor utility assembly comprising:

a universal mount base structured and disposed to be removably, yet securely attached to the top surface of the monitor, a generally rigid top panel, said top panel having a width generally equivalent to a width of the monitor, upper mount means structured and disposed to secure said top panel to said mount base, in overlying relation atop the monitor, said upper mount means being further structured to provide forward and backward, slided movement of said top panel relative to said mount base such that said top panel selectively overhangs beyond the front surface of the monitor in order to selectively shade and screen a screen on the front surface of the monitor from light and glare, said upper mount means comprising:

a pair of spaced bracket members extending upwardly from said mount base, a pair of spaced flanges extending downwardly from said top panel and structured for generally adjacent abutting engagement with said bracket members, said bracket members and said flanges including a correspondingly disposed aperture and an elongate slot formed therein in confronting relation with one another, and a pair of fastener elements, each of said fastener elements being structured and disposed to extend through a corresponding one of said apertures and a corresponding, confronting one of said slots such that said flanges, and therefore said top panel, are able to slide and pivot relative to said bracket members, and therefore said mount base.

* * * * *